United States Patent
Masson et al.

(10) Patent No.: US 9,847,811 B2
(45) Date of Patent: Dec. 19, 2017

(54) UWB PULSE GENERATOR

(71) Applicant: COMMISSARIAT A L'ENERGIE ATOMIQUE ET AUX ENERGIES ALTERNATIVES, Paris (FR)

(72) Inventors: Gilles Masson, Renage (FR); Frédéric Hameau, Saint-Nizier du Moucherotte (FR); Laurent Ouvry, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 15/034,394

(22) PCT Filed: Dec. 17, 2014

(86) PCT No.: PCT/EP2014/078259
§ 371 (c)(1),
(2) Date: May 4, 2016

(87) PCT Pub. No.: WO2015/091668
PCT Pub. Date: Jun. 25, 2015

(65) Prior Publication Data
US 2016/0269075 A1    Sep. 15, 2016

(30) Foreign Application Priority Data
Dec. 18, 2013  (FR) ..................... 13 62885

(51) Int. Cl.
*H04B 1/707*    (2011.01)
*H04B 1/717*    (2011.01)

(52) U.S. Cl.
CPC ......... *H04B 1/7172* (2013.01); *H04B 1/7174* (2013.01)

(58) Field of Classification Search
USPC ......... 375/219, 130, 354; 327/277, 427, 432
See application file for complete search history.

(56) References Cited

U.S. PATENT DOCUMENTS 6,026,125 A    2/2000  Larrick, Jr. et al.
8,351,490 B2 *  1/2013  Chen ............ H03F 1/223
                                    340/10.1

(Continued)

FOREIGN PATENT DOCUMENTS

EP    1 526 648 A1    4/2005

*Primary Examiner* — Eva Puente
(74) *Attorney, Agent, or Firm* — Baker Hostetler LLP (57) ABSTRACT

An ultra-wideband pulse generator, for radio communication at frequencies of 2 to 11 GHz comprises an oscillator providing an output signal at carrier frequency F0 followed by a radiofrequency switching transistor and a control circuit controlling the gate of the transistor to turn it on for duration T corresponding to the desired duration of a UWB pulse. The control circuit is arranged to successively apply, during the same UWB pulse, a first gate voltage turning the transistor on with first internal resistance value for a first part of duration T, a second gate voltage that turns the transistor on with second internal resistance value, different from the first, for a second part of duration T. These internal resistances cause the oscillation to be attenuated differently for duration T of the pulse, allowing the spectrum of the pulse to maintain it within the spectral templates imposed by the radio communication standards.

20 Claims, 5 Drawing Sheets (56) References Cited

U.S. PATENT DOCUMENTS

| | | | |
|---|---|---|---|
| 9,054,789 B2 * | 6/2015 | Bourdel | H04B 1/71632 |
| 9,190,145 B2 * | 11/2015 | Takahashi | G11C 13/0002 |
| 2004/0041618 A1 * | 3/2004 | Ha | G09G 3/3648 327/427 |
| 2008/0049878 A1 * | 2/2008 | Stoica | H03L 7/0812 375/354 |
| 2008/0180158 A1 * | 7/2008 | Scollo | H03K 17/567 327/432 |
| 2008/0192531 A1 * | 8/2008 | Tamura | G11C 13/0007 365/148 |
| 2010/0177803 A1 | 7/2010 | Raphaeli et al. | |
| 2013/0285728 A1 * | 10/2013 | Granhaug | H03K 5/159 327/277 |

\* cited by examiner

UWB PULSE GENERATOR

CROSS-REFERENCE TO RELATED APPLICATIONS

This application is a National Stage of International patent application PCT/EP2014/078259, filed on Dec. 17, 2014, which claims priority to foreign French patent application No. FR 1362885, filed on Dec. 18, 2013, the disclosures of which are incorporated by reference in their entirety.

FIELD OF THE INVENTION

The invention relates to the field of ultra-wideband (UWB) telecommunications, and more particularly to communication by very short pulses of a carrier frequency.

BACKGROUND

By way of indication, UWB communication is regulated for frequencies that may range from 3 to 10.6 GHz and the permitted spectral templates are defined, on the one hand, by regulatory constraints (FCC in the United States, ECC in Europe, etc.) and, on the other hand, by constraints imposed by standards (IEEE 802.15.4a, IEEE802.15.6 standards, etc.) or proprietary. These constraints on spectral templates may be grouped under the term "template specification". The bandwidth is in the range of 1 GHz and the duration of the transmitted pulses is typically of a few nanoseconds. More generally, a UWB signal is defined as a signal whose passband bandwidth at −10 dB of the maximum-power spectral density is higher than 500 MHz for frequencies that are above 2.5 GHz, or alternatively, for center frequencies that are lower than 2.5 GHz, whose passband bandwidth is greater than 20% of the center frequency.

Figure 1:
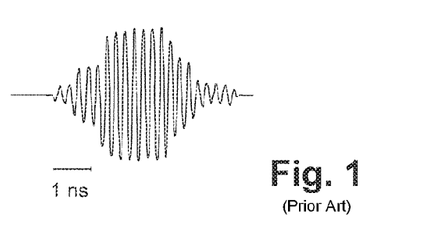
FIG. 1, already described, shows a UWB pulse with a carrier frequency of 4 GHz, with a duration of around 5 nanoseconds.
Figure 2:
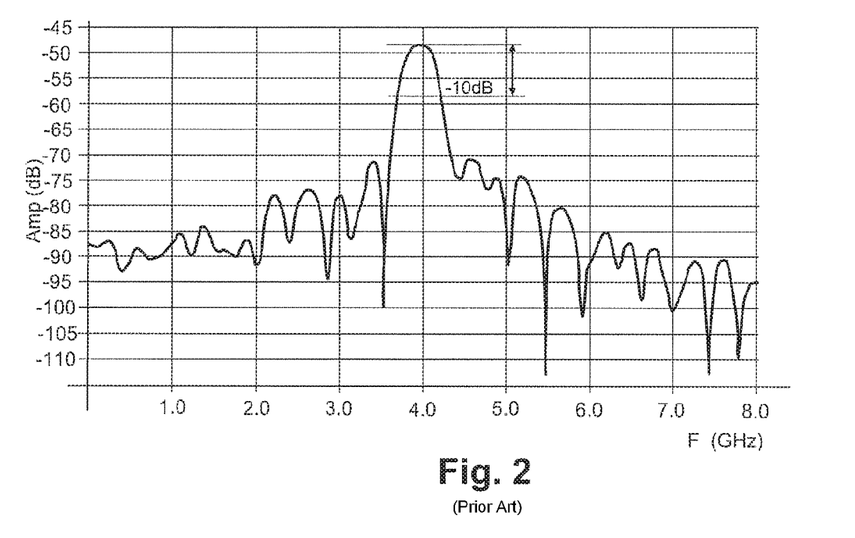
FIG. 2, already described, shows the spectrum of this pulse, with a passband bandwidth at −10 dB of around 500 MHz.

By way of example, FIG. 1 shows the general shape of a 5 nanoseconds UWB pulse with a carrier frequency of 4 GHz. FIG. 2 shows the spectral density of this pulse. This spectrum comprises a main peak at the carrier frequency and a passband bandwidth at −10 dB of around 500 MHz, but it also comprises numerous side lobes whose frequency may be close to the carrier frequency. These peaks run the risk of making the spectrum extend outside the template imposed by the specification, and it is therefore necessary to ensure that they are reduced as much as possible.

The use of fully digital transmitter architectures that allow the spectrum of the transmitted pulse to be effectively controlled in order to reduce the side lobes thereof is theoretically known, but these architectures are not readily compatible with standard integrated-circuit technologies when the aim is to operate with frequencies that are higher than 4 GHz, and even less so at frequencies of 8 GHz. These architectures synthesize a waveform in the time domain in the manner of a digital filter operating at the Nyquist frequency. The value, as well as the precision, of the coefficients of the implemented filter have a direct impact on the level of the side lobes. However, the switching times of digital circuit transistors are too high (at least 16 GHz to operate at an 8 GHz center frequency) in the most commonly used technologies and it would be necessary to use much more expensive technologies to solve the problem.

A transmitter architecture that has been proposed in order to implement UWB pulse transmitters in the band of 3 to 8 GHz is an architecture using an oscillator to generate a carrier frequency and a high-speed switch (radiofrequency switch) that is in series and downstream of the oscillator, between the oscillator and a UWB pulse transmission antenna: the high-speed switch is normally blocked and it is turned on for a very brief duration which is the desired duration of the UWB pulse. The output of the switch provides the UWB pulse to the antenna at the carrier frequency of the oscillator. It may be thought of as a sort of time windowing, for a very brief duration T, of an oscillation generated over a longer period.

Figure 3:
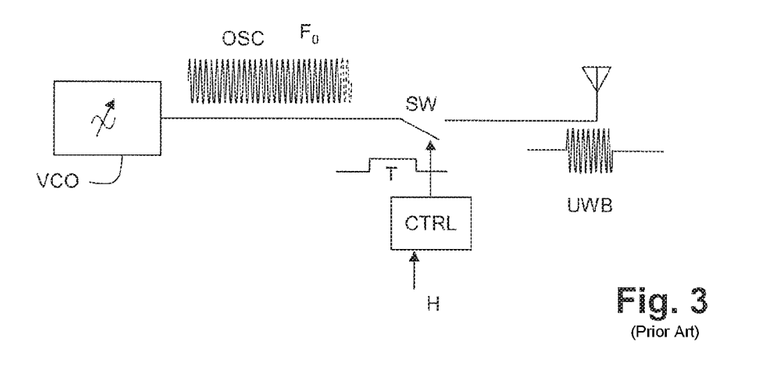
FIG. 3, already described, shows the principle of a pulse generator with an LC oscillator and a downstream radiofrequency switch.

FIG. 3 shows the principle of such a UWB transmitter. The switch SW may be a switch with one or more transistors, potentially comprising inductors. The oscillator is a controlled-frequency oscillator VCO that allows the carrier frequency to be adjusted $F_0$. A control circuit CTRL closes the switch for a duration T which is the desired duration for the pulse.

The failing of the implementations proposed so far that are based on this architecture is that they do not allow the spectrum of the transmitted pulse to be controlled correctly, and in particular they do not allow the side lobes to be reduced, if necessary, which runs the risk of making the spectrum extend outside the template imposed by the specification. Only the passband bandwidth (at the level of the main lobe) may be controlled by acting upon the duration for which the switch is closed.

The following documents describe UWB pulse generators:

Xu et al., Power-Efficient Switching-Based CMOS UWB Transmitters for UWB Communications and Radar Systems. IEEE TRANSACTIONS ON MICROWAVE THEORY AND TECHNIQUES, Vol. 54, NO. 8, August 2006.

Li, The Design of CMOS Impulse Generators for Ultra-Wideband Communication and Radar Systems. THESIS THE UNIVERSITY OF TEXAS AT ARLINGTON, August 2011.

Raphaeli, et al., Ultra Wideband On-Chip Pulse Generator. Patent application US 2010/0177803 A1, July 2010.

Anh Tuan Phan, et al., Energy-Efficient Low-Complexity CMOS Pulse Generator for Multiband UWB Impulse Radio. IEEE TRANSACTIONS ON CIRCUITS AND SYSTEMS, Vol. 55, NO. 11, December 2008.

Barras, et al., Low-Power Ultra-Wideband Wavelets Generator With Fast Start-Up Circuit. IEEE TRANSACTIONS ON MICROWAVE THEORY AND TECHNIQUES, Vol. 54, NO. 5, May 2006.

Pelissier, et al., A 112 Mb/s Full Duplex Remotely-Powered Impulse-UWB RFID Transceiver For Wireless NV-Memory Applications. IEEE JOURNAL OF SOLID-STATE CIRCUITS, Vol. 46, NO. 4, April 2011.

SUMMARY OF THE INVENTION

The present invention is based upon the basic architecture of FIG. 3 and proposes to act upon the internal resistance of the switch in the "on" state, for the duration of the pulse, in order to modify the shape of the UWB pulse envelope and thereby to act upon the spectrum thereof.

The UWB pulse generator according to the invention therefore comprises an oscillator that provides an output signal at a carrier frequency $F_0$ followed by a radiofrequency switching transistor and a control circuit that controls the gate of the transistor in order to turn it on for a duration T that corresponds to the desired duration of a UWB pulse, characterized in that the control circuit is arranged so as to successively apply, during one and the same UWB pulse, a first gate voltage that turns the transistor on with a first internal resistance value for a first part of the duration T, then at least a second gate voltage that turns the transistor on with a second internal resistance value, different from the first value, for a second part of the duration T.

The different gate voltages lead to different internal resistances of the transistor in the "on" state and hence to the pulse being attenuated differently while passing through the switching transistor. This results in a modification of the spectrum of the transmitted pulse with respect to the spectrum it would have if the transistor were simply controlled in an "on/off" manner without variation in the level of the command for turning it on.

The control circuit may comprise the following elements:

two logic inverters supplied with a supply voltage that have their outputs connected to the gate of the switching transistor via respective resistors;

and a sequencing circuit that sets up, at the input of the first inverter, a first logic signal for turning the switching transistor on and, at the input of the second inverter, a second logic signal for turning the switching transistor on, with a partial overlap between the first and the second logic signal, allowing the definition of at least one period of time during which only one of the two logic signals is at a level for turning the switching transistor on and one period of time during which both logic signals are at this level, the two periods being adjacent.

Consequently, the gate voltage of the radiofrequency switching transistor will successively take on at least two values, depending on whether only one or both switches apply a signal to the transistor to turn it on. In one phase, a single inverter is active and the voltage applied to the gate of the transistor has a value that is dependent on the value of the resistor connected to its gate. In the other phase, both inverters are simultaneously activated and the voltage applied to the gate depends on both resistors connected to its gate.

By "partial overlap" between the first and the second logic signals, it is understood that there is at least one instant for which one of the signals is at a level for turning the transistor on while the other is not at this level, and one instant for which both logic signals are at a level for turning it on. The first signal may start alone, then continue while the second signal starts, and the second may stop before the end of the first or go on beyond the end of the first; or else both signals may start at the same time and finish separately; or else both signals may start separately, go on together and finish simultaneously. In any case, the UWB pulse starts at the same time as the logic signal that is the first to be activated, and finishes at the same time as the logic signal that is the last to stop.

The output signal of the oscillator that provides the carrier frequency may be a differential signal, and there are then two radiofrequency switching transistors that operate symmetrically and are controlled symmetrically by the two inverters.

The inverters may have different transistor sizes, the size of the transistors of which they are composed playing a role (by resistive division) in the voltage obtained at the gate of the switching transistor due to the fact that the internal resistance of the inverters is non-zero.

The resistors that are connected between the output of an inverter and the gate of a radiofrequency switching transistor may be composed of multiple resistors that may be switched in order to select a chosen resistance value.

The inverters may also be composed of an array of multiple inverters in parallel with different output resistance characteristics, one inverter being selected on the basis of desired resistance characteristics and the inverters being able to be selectively placed in a high-impedance state if they are not selected.

Provision may additionally be made for the value of the supply voltage of the inverters to be modifiable, thereby allowing the voltage that is actually applied to the gate of the switching transistor, and hence the resistance of the transistor in the "on" state, to be acted upon.

Lastly, when the LC oscillator is an oscillator with differential branches whose operation is switched by the application or interruption of a supply current to the pair of differential branches, provision may be made for the supply current of the pair of branches to be modified during the UWB pulse, thereby giving additional room for maneuver to act upon the spectrum of the transmitted pulse, in particular in order to compensate for the fact that the center frequency of the pulse may vary during the pulse.

This oscillator may be provided with control for the polarity of the oscillation in order to select one phase or an opposite phase upon initiation of the oscillator.

BRIEF DESCRIPTION OF THE DRAWINGS

Other characteristics and advantages of the invention will become apparent upon reading the detailed description which follows, given with reference to the appended drawings in which:

FIG. 9 shows an equivalent circuit diagram of when a single inverter I1 turns the switching transistor on;

FIG. 10 shows an equivalent circuit diagram of when the other inverter I2 turns the switching transistor on;

FIG. 11 shows the input signals that are applied to the control circuit of FIG. 8 and the resulting gate voltage profile of the switching transistor;

DETAILED DESCRIPTION

The invention is based upon the principle of the architecture of FIG. 3, but with a particular control of the switch SW. It will be described in more detail in a configuration using an oscillator of a particular type, which is an LC resonating-charge oscillator with symmetrical output, supplied with current by a current source that is switched in order to activate or deactivate the oscillator. However, the invention is applicable to other types of oscillator.

Figures 4, 5:
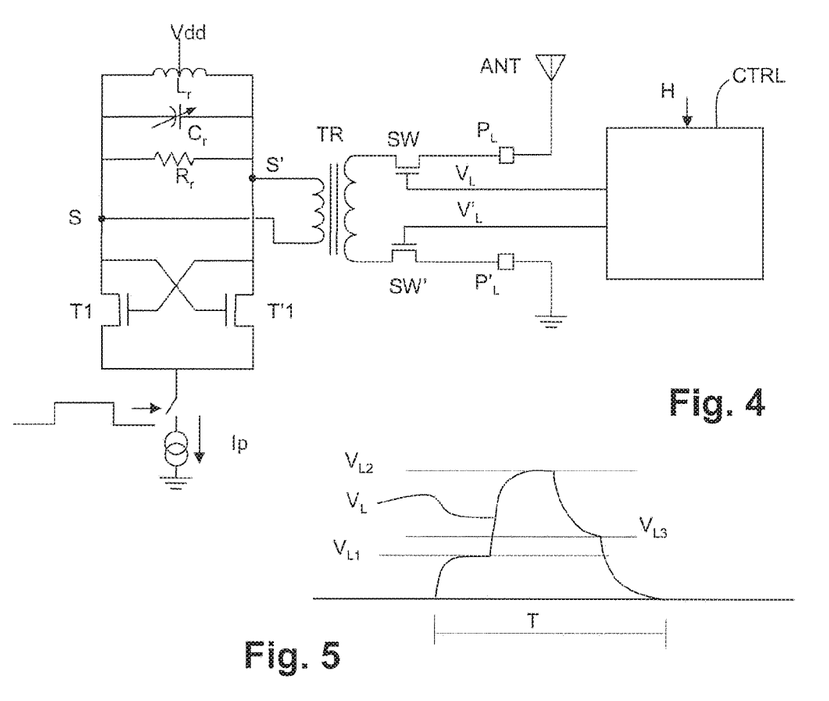
FIG. 4 shows the generator according to the invention with an oscillator of a particular type.
FIG. 5 shows the variation profile of the gate voltage of the switching transistor during the UWB pulse.

FIG. 4 shows the generator according to the invention. The oscillator comprises a pair of two balanced differential branches that are supplied with power by, at one end, a supply voltage source Vdd and, at the other end, by a common current Ip. This common current is present for a duration $T_{OSC}$ that is longer than the duration T of the UWB pulse. It may be permanent and may be interrupted, in order to reduce consumption, only in the phases during which the UWB communication is interrupted. The control circuit CTRL, located downstream, will select a time window of the oscillation, for a duration T of a few nanoseconds, that will be the duration of the pulse.

The differential branches each comprise a transistor, T1 for the first branch, T'1 for the second branch. A load is inserted between the drain of the transistor and the supply voltage source Vdd. This load is an LC circuit, resonating at the carrier frequency $F_0$ of the UWB pulse to be transmitted. In the example shown, the load is shared between the branches; it comprises an inductor $L_r$ and a capacitor $C_r$, in parallel, as well as a damping resistor $R_r$ that may be the intrinsic internal resistance of the inductor. These elements in parallel are connected between the output S of the first branch and the output S' of the second branch. The outputs S and S' may be made at the drains of the respective transistors T1 and T'1 of the first and the second branch.

The supply voltage source is preferably connected, as is the case in FIG. 4, to a center tap on the loading inductor $L_r$ in order to ensure that the oscillator receives a continuous supply.

The oscillation is generated between the outputs S and S', which are connected to the primary winding of a transformer TR.

The loading inductor $L_r$ of the resonant circuit does not have to be present if the inductance on the side of the primary of the transformer has a value that is sufficient to fulfill the role of the loading inductor $L_r$ in the LC resonant circuit. In this case, provision must be made for the continuous voltage supply source Vdd to be connected to a center tap on the primary of the transformer in order to be able to supply the voltage Vdd symmetrically to both differential branches.

The continuous oscillation present at the output of the transformer TR is applied through a switch to the output pads $P_L$ and $P'_L$ of the integrated circuit in which the pulse generator is implemented, and from there to a transmission antenna ANT. The switch defines, when it is turned on, a time window of duration T in which the oscillation may be transferred to the output pads. In a symmetrical construction as shown in FIG. 4, provision may be made for the switch to be doubled and comprise two high-speed switching transistors each connected between a respective terminal of the secondary winding of the transformer and a respective output pad. In an asymmetrical configuration, the switch may comprise a single transistor.

The switches are radiofrequency switching transistors SW, SW', i.e. transistors with very fast switching (faster than the duration of the UWB pulses). The duration of switching (passing from the "off" state to the "on" state or vice versa) is multiple times, for example at least five times, faster than the duration T of the pulse, the latter potentially being around 1 to 5 nanoseconds.

A control circuit CTRL defines the time window of duration T in which the oscillation received from the secondary of the transformer will be transmitted by the switch toward the output pads. Outside the duration T, the oscillation continues but is not transmitted.

The control circuit here has a function that is not a simple "on/off" switching control function, but rather a switching function with control of the control voltage value applied to the gates of the transistors SW and SW' in the "on" state for the duration of the pulse. It sets up gate voltage values according to a well determined sequence within the duration T and, to this end, its operation may be controlled by a clock H.

FIG. 5 shows an exemplary time profile of the voltage $V_L$ applied by the control circuit CTRL to the gate of one of the transistors (the gate voltage is the same for both transistors) for a duration T. This voltage comprises at least two different levels $V_{L1}$ and $V_{L2}$ for which, taking into account the technology used to implement the transistor, the internal resistance of the transistor in the "on" state acquires two significantly different values. One of the voltage levels, $V_{L2}$, may be the general supply level Vdd of the integrated circuit. Here, there are three voltage levels $V_{L1}$, $V_{L2}$, and $V_{L3}$.

In the example of FIG. 5, it is assumed that lower gate voltage levels $V_{L1}$ and $V_{L3}$ are applied at the start and at the end of the pulse and a higher level, $V_{L2}$, is applied in the middle of the pulse. It must be understood that it is possible to have identical levels $V_{L1}=V_{L3}$ at the start and at the end, respectively, and a higher level $V_{L2}$ in the middle, or even to have the level $V_{L2}$ at the start or at the end (but not both) rather than a lower level $V_{L1}$ or $V_{L3}$.

The voltage level variation at the gate of the switching transistors induces a variation in the attenuation by the switching transistors of the current level of the oscillation transmitted by the transformer TR. This temporal variation in the attenuation results from the fact that the internal resistance of the switching transistors SW, SW" varies depending on the gate voltage. The temporal variation in the attenuation, even during the UWB pulse, modifies the rising and falling slopes and therefore the spectrum of this pulse. The modification chiefly acts upon the side lobes of the spectrum and it is therefore possible to look for voltage profile forms, such as the simple profile with two levels of FIG. 5, that improve the spectrum in a desired way, in particular in such a way as to reduce the side lobes in order to respect the template specification.

The attenuation of the oscillation at a given instant depends on the impedance of the antenna and the series impedances of the transistors in the "on" state. The impedance of the transistor involves the resistance $R_{ON}$ of the conductive transistor and the impedance of the capacitor $C_{ON}$ between the drain and the source of this transistor, namely $1/(2\pi F_0 C_{ON})$.

Figure 6:
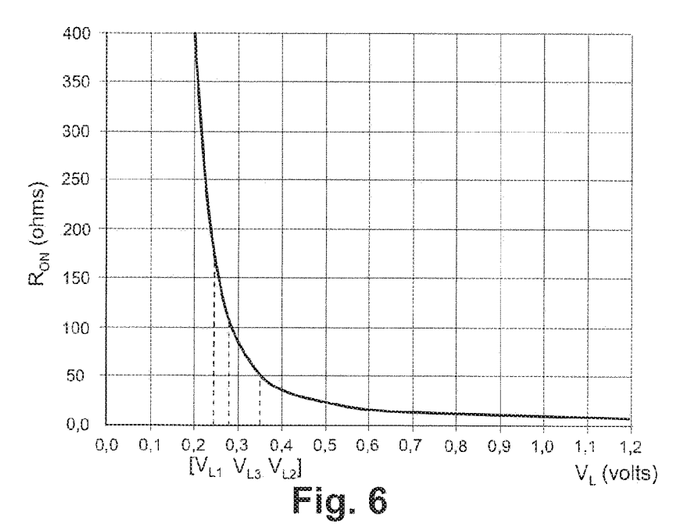
FIG. 6 shows an exemplary variation curve of the internal resistance of the switching transistor in the "on" state.

FIG. 6 shows an exemplary internal resistance curve of an NMOS radiofrequency switching transistor as a function of the voltage $V_L$ that is applied to the gate of the transistor. The internal resistance has a value of around 7 ohms when the voltage Vdd (here: 1.2 volts) is applied to the gate, a value of 50 ohms when $V_L$ is equal to 0.35 volts, and a value of around 170 ohms when $V_L$=0.25 volts. The variation is therefore large and serves, according to the invention, to attenuate the start and/or the end, or even the middle, of the transmitted pulse in order to modify the spectrum thereof.

In a digital example at a carrier frequency $F_0$ of 4 GHz, the resistance $R_{ON}$ of the transistor follows the curve of FIG. 6 and has a value of 7 ohms at a gate voltage $V_L$=Vdd=1.2 volts. Its source-drain capacitance is 80 femtofarads and the impedance of the antenna is 50 ohms. It has been found to be possible to attenuate the pulse at an attenuation ratio of around 2.2 for a gate voltage of 0.3 volts, and with a ratio of around 3.4 for a gate voltage of 0.24 volts. In another example with the same digital values but at a frequency $F_0$ of 8 GHz, the attenuation ratios are about 2 and 2.8 for 0.3 volts and 0.24 volts, respectively.

Figure 7:
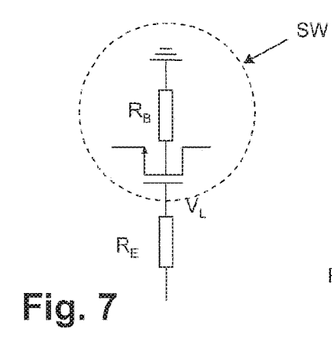
FIG. 7 shows an equivalent circuit diagram of the switching transistor.

FIG. 7 shows a radiofrequency switching transistor SW. It is an NMOS transistor (faster and a better conductor than a PMOS transistor). Its particularity is that its channel is not directly at the potential of the substrate (0 volts) but rather it is connected to the substrate via a resistor $R_B$ of a few kiloohms, whose function is to reduce the conductivity of the drain-substrate and source-substrate diodes, thereby improving power transmission and reducing insertion losses. Furthermore, its gate is controlled via a series resistor $R_E$ of a few kiloohms that reduces the variations in the gate-source voltage when the control voltage varies.

Figure 8:
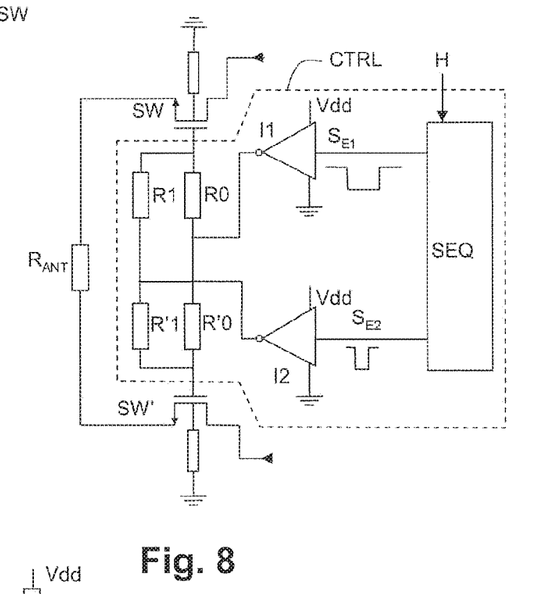
FIG. 8 shows a control circuit allowing the invention to be implemented.

FIG. 8 shows a preferred exemplary embodiment of the control circuit CTRL allowing the invention to be implemented. The sources of the switching transistors are connected to an antenna that is symbolized by an antenna impedance $R_{ANT}$. The drains receive the signals issued by the secondary of the transformer TR. The gates receive a gate voltage $V_L$ that is provided by the control circuit. The control circuit comprises two logic inverters I1 and I2, and four resistors: R0 et R'0, with the same value, respectively connected between the output of the inverter I1 and the gates of the switching transistors SW and SW'; R1 and R'1, with the same value, respectively connected between the output of the inverter I2 and the gates of the switching transistors SW and SW'.

The resistors R0, R'0, R1, R'1 constitute resistive loads at the output of the inverters I1 and I2 and the output voltage produced by the inverters in the "on" state depends not only on the value of these loads, but also on the intrinsic internal resistances of the inverters. The intrinsic internal resistances of the inverters furthermore depend on their output logic state.

The inverters receive, from a sequencing circuit SEQ controlled by a clock H, respective input logic signals $S_{E1}$ and $S_{E2}$ that are signals for blocking, then turning on, the switching transistors SW and SW'. These signals are at the high logic level outside the UWB pulses and the inverters then block the conduction of the transistors. They drop to the low level during time slots, the combination of which creates a gate voltage profile such as, for example, that of FIG. 5. They do not have the same duration and they are in partial overlap; the total duration from the first falling edge of the slots until the last rising edge of the slots is the duration T of the pulse.

When the two inverters receive as input a signal for blocking the transistors SW and SW' ($S_{E1}$ and $S_{E2}$ at the high logic level), they both provide a zero output voltage and this voltage is transferred to the gates of the switching transistors SW and SW'.

When they both receive as input a signal for turning on the transistors SW and SW' ($S_{E1}$ and $S_{E2}$ at the low logic level), they both provide an output voltage Vdd and this voltage is transferred to the gates of the switching transistors.

However, when one of the inverters receives a blocking signal and the other receives a signal for turning it on, the intermediate voltage $V_L$ applied to the gates may be calculated as a function of the resistors R0 and R1 and the internal resistances of the inverters.

The inverters are generally composed of a pair of transistors in series, the transistors being a PMOS transistor and an NMOS transistor. In principle, the NMOS transistor conducts in order to provide a blocking signal to the transistors SW and SW' and the internal impedance of the inverter is then the resistance $R_N$ of the NMOS transistor in the "on" state; conversely, the PMOS transistor conducts in order to provide a signal for turning the transistors on and the internal impedance of the inverter is then the resistance $R_N$ of the PMOS transistor in the "on" state. The resistances $R_N$ and $R_P$ are generally different but in principle they are the same for both inverters. Nevertheless, provision may be made for the inverters to be different and to have different internal resistances, both for the NMOS transistor and for the PMOS transistor.

If the inverter I1 is alone in providing a signal for turning the transistors on, its internal resistance is $R_{P1}$ at the moment at which the internal resistance of the inverter I2 is $R_{N2}$. It may therefore be assumed that there is a powered resistive voltage divider between the supply voltage Vdd and the ground; this voltage divider provides identical intermediate voltages $V_L$ and $V'_L$ to the junction point between the resistors R0 and to the junction point between the resistors R1. These intermediate voltages are applied to the gates of the high-speed switching transistors.

Figure 9:
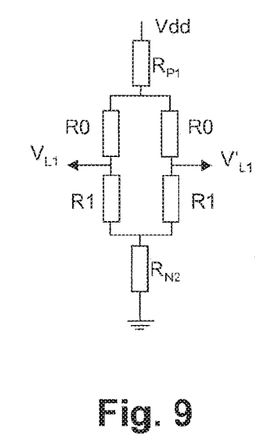
Figures 10, 11:
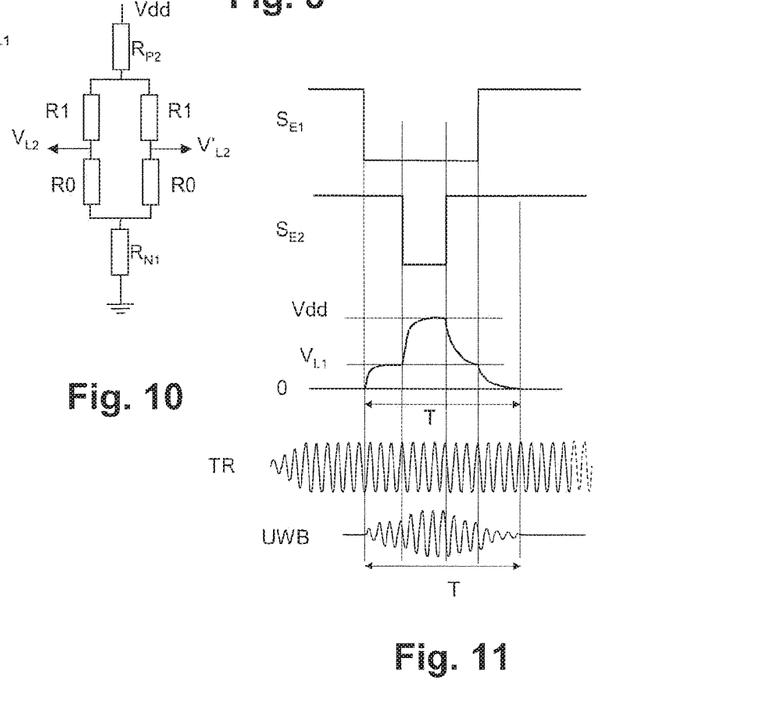

The equivalent diagram of the voltage divider is shown in FIG. 9 in the case in which the inverter I1 is alone in providing a signal for turning the transistors on, and in FIG. 10 in the case in which the inverter I2 is alone in providing a signal for turning the transistors on. The resistors R0 and R'0 are identical and have been represented by two resistors R0. Likewise for R1 et R'1.

It can be shown that in the first case, the voltage $V_L=V'_L$ is:

$$V_{L1}=V'_{L1}=Vdd\times[R1+2R_{N2}]/[2R_{N2}+2R_{P1}+R0+R1],$$

while in the second case it becomes:

$$V_{L3}=V'_{L3}=Vdd\times[R0+2R_{N1}+]/[2R_{N1}+2R_{P2}+R0+R1].$$

For example, if $R_{N1}=500$ ohms, $R_{N2}=250$ ohms, $R_{P1}=4000$ ohms, $R_{P2}=5000$ ohms; if Vdd=1.2 volts and if R0=2500 ohms and R1=2000 ohms are chosen, it is found that $V_{L1}\approx0.23$ volts and $V_{L3}=0.27$ volts.

On the curve in FIG. 6, it may be seen that the resistances of the high-speed switching transistors are then around 240 ohms and 120 ohms respectively.

If a profile such as that of FIG. 5 is used, only the inverter I1 is activated in order to turn the transistors SW and SW' on at the start of the pulse, then the two switches are simultaneously activated in the middle of the pulse, and finally only the inverter I2 is activated at the end of the pulse. The resistance of the radiofrequency switching transistor in the "on" state is 240 ohms at the start, then around 7 ohms, then 120 ohms.

In order to define the desired voltage values $V_L$ for each phase precisely and in a controlled manner, provision may be made for the resistors R0 and/or R1 to be implemented by an array of resistors in parallel that may be turned on and off by switches in order to give a desired value to R0 and/or R1.

Provision may also be made for each inverter to be composed of an array of multiple inverters in parallel with different output impedance characteristics $R_P$, $R_N$, one inverter being selected on the basis of desired resistance characteristics and the inverters being able to be selectively placed in a high-impedance state if they are not selected.

Lastly, as the value of the supply voltage of the inverters plays a role in the calculation of $V_L$, provision may be made for this supply voltage not to be necessarily equal to the general supply voltage Vdd. For example, the supply voltage of the inverters is a voltage that is lower than Vdd; it may be obtained by inserting a resistor, diodes or any other regulating element between the general supply Vdd and the sources of the transistors of which the inverters are composed. The resistor or the diodes may be controllable in order to define a desired supply voltage of the inverters, and this supply voltage may be different for the two inverters.

FIG. 11 shows a timing diagram for the turning on of the two switches I1 and I2 by the signals $S_{E1}$ and $S_{E2}$ that are generated in the control circuit CTRL and applied to the inputs of the inverters I1 and I2 (turning the switching transistors on for $S_{E1}$ or $S_{E2}$ at the low level); the resulting voltage profile $V_L$, $V_{L'}$ at the gates of the transistors is shown in the case in which only switch I1 is activated at the start and at the end of the pulse; the voltage $V_L$ successively acquires the values $V_{L1}$, $V_{L2}$=Vdd, and then $V_{L1}$ again. Also shown is the oscillation that occurs on the secondary of the transformer TR and the pulse UWB in the window of duration T, with a pulse amplitude envelope that is attenuated at the start and at the end of the pulse.

In the foregoing, the oscillator is assumed to have been operating with a constant current Ip before, during and after the duration T of the UWB pulse, meaning that a constant current source of value Ip was being switched in an "on/off" manner in order to turn it on when an oscillation was to be set up and to turn it off when no oscillation was to be set up.

However, provision may be made for the current source to be switched stepwise between multiple values Ip1, Ip2, Ip3, etc.

Figure 12:
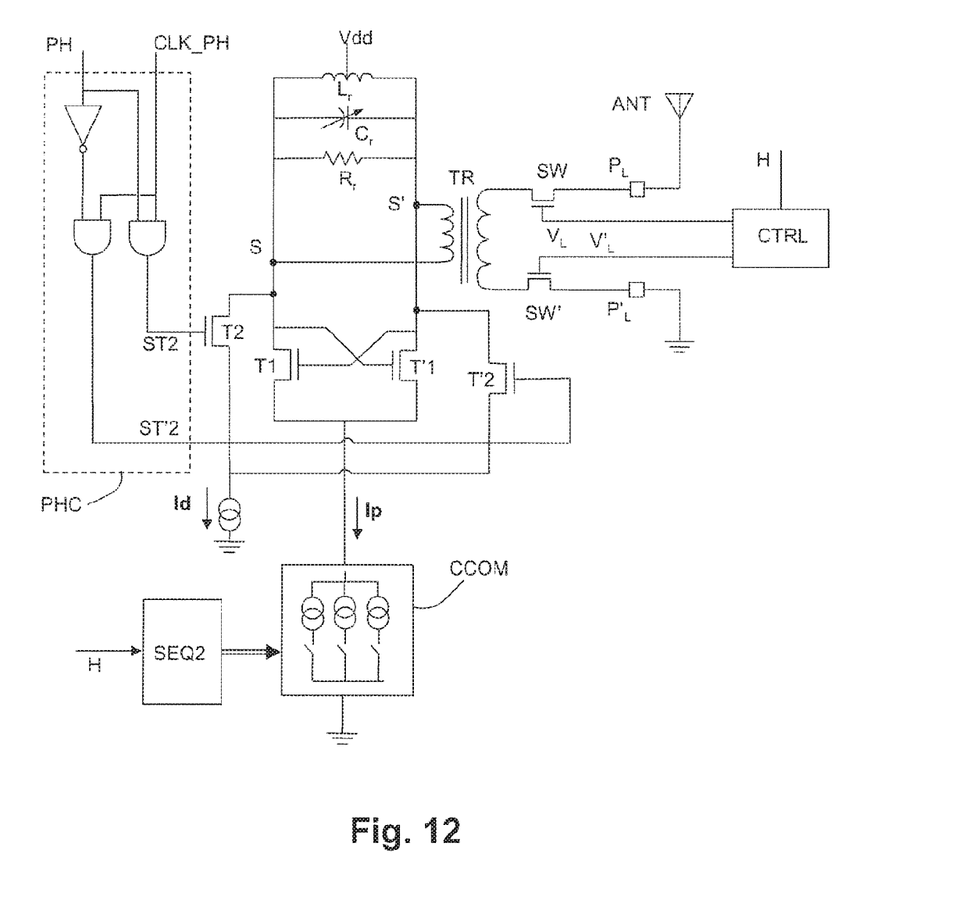
FIG. 12 shows a complete diagram of the generator, including means for controlling the binary phase (0 or 180°) of the pulse and means for controlling the form of the current of the oscillator.

In this case, a current-switching circuit CCOM provides the current Ip. This circuit comprises multiple current sources in parallel, allowing current values Ip1, Ip2, Ip3, etc. to be provided, and switches that are associated with each current source in order to selectively control the sources so as to set up the desired current at a given instant. Each current value may be set up either by a single source with the value Ip1, Ip2, Ip3, etc. or by multiple sources in parallel whose sum is equal to Ip1, Ip2 or Ip3, etc. A sequencer SEQ2 controlled by the general clock H precisely defines the instants for switching the current.

FIG. 12 shows the oscillator LC switched by variable current, with the same elements as in FIG. 4 and a current-switching circuit CCOM.

In the case in which the oscillator LC so comprises multiple current sources that may be switched according to very precise sequences, provision may be made for the value of the source current to be modified during the pulse of duration T. This modification induces changes in the level of the oscillation received by the antenna downstream of the radiofrequency switching transistors SW, SW'. These changes in level may be combined with the changes in attenuation introduced by the switching transistors in order to fine-tune the UWB pulse spectrum.

All of the control signals (signals that control the various current values and the signals that define the various gate voltages of the radiofrequency switching transistors) must be controlled jointly in order to respond to the need to respect the spectral template specification.

For communication with frequency modulation, it is possible to act upon the value of the variable capacitance $C_r$ of the oscillator (FIG. 4 or FIG. 12) in order to modulate the frequency from one pulse to the next. The capacitor may then be composed of a varactor diode or equivalent; the capacitance varies depending on a bias voltage applied to the diode and the bias voltage varies, for example, between two values; this allows binary modulation as a function of binary information to be transmitted, and the resulting frequency variation may be detected in a receiver.

For communication with amplitude modulation, it is possible to act upon the value of the supply current Ip of the differential pair at the peak of the variation envelope of the signal level during the pulse. By modulating the value of the supply current in a binary manner between two levels (or in an "on/off" manner for OOK modulation) from one pulse to the next, the transmitted pulse is modulated in amplitude and this modulation may be detected in a detector.

For binary phase-shift keying (BPSK), two current-injecting branches, respectively connected to the two outputs S and S', may be added to the oscillator as shown in FIG. 12, along with a phase control circuit that allows an injection of current into either one or the other injection branch just as an oscillation is initiated in the oscillator, i.e. just as a supply current Ip is applied to the differential pair, after which the injected current is quenched in the two branches.

Thus, at the start of the pulse, the differential branches are unbalanced due to the current injected into one of the outputs, and an oscillation initiation phase is defined as a function of the direction of this imbalance. Two opposite phases are possible depending on the direction of the imbalance, since either one or the other of the differential branches becomes conductive first when the current-switching circuit allows a current to flow through the pair of differential branches.

FIG. 12 shows these two injecting branches and the phase control circuit PHC.

The group of two bypass branches comprises an injection current source (current of amplitude Id) common to both branches that are connected at their base; the injecting branches each comprise a respective transistor T2, T'2; the injection current source draws a current Id from the two injecting branches that are connected at their base by the emitters of these two transistors. The transistors T2 and T'2 are not on at the same time, so that the current (−Id) is injected either into the output S or into the output S' depending on whether the transistor T2 or the transistor T'2 has been turned on. The transistors T2 and T'2 may be simultaneously blocked when no current is to be injected into either the output S or the output S'.

Depending on the desired phase upon initiation of the oscillation, the transistor T2 or the transistor T'2 is turned on just as the oscillation is initiated, i.e. just before a current Ip is applied to the oscillator; then this transistor remains on for a brief moment, after which it is blocked once more for the entirety of the remainder of the duration of the oscillation.

If it is the transistor T2 that is on at the start of the oscillation, it is the transistor T1 that tends to conduct initially upon initiation of the oscillation. If, on the other hand, it is the transistor T'2 that is on for the first part of the duration T, it is the transistor T1, rather than the transistor T1, that tends to conduct initially upon initiation of the oscillation. The initiation phase will therefore be inverted depending on the side from which the current Id is injected. This phase is subsequently maintained throughout the oscillation.

The phase control circuit therefore initially sets up a control signal for turning the transistor on ST2 at the gate of the transistor T2 or a control signal ST'2 at the gate of the transistor T'2 depending on the desired phase. These signals are preferably set up on the basis of a periodic synchronization signal CLK_PH that is composed of slots that define, in each period, the start and the end of the application of a bypass current; these slots are applied to two AND gates of which one receives a logic signal PH for selecting the phase PH and the other the inverse PH_B of this signal PH via an inverter. The outputs of the AND gates provide the signals ST2 and ST'2 that are applied to the gates of the transistors T2 and T'2.

Figure 13:
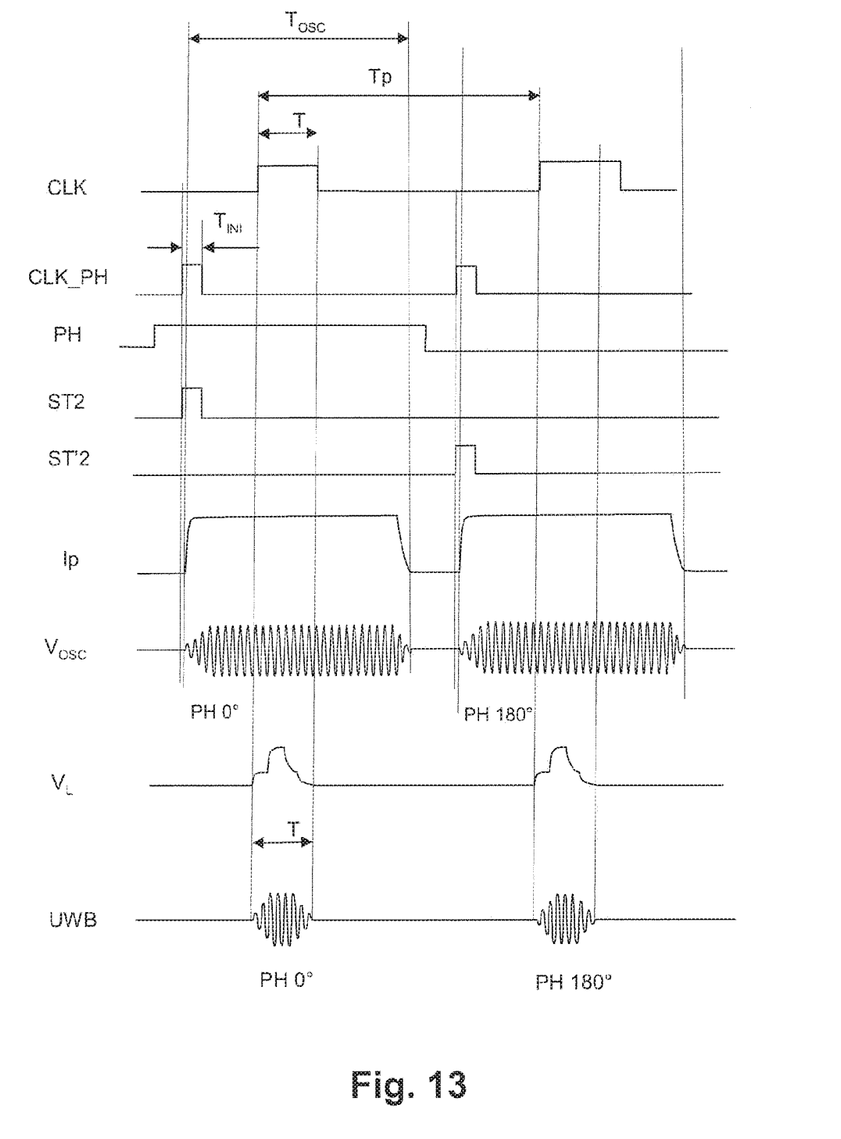
FIG. 13 shows an operating timing diagram of the generator of FIG. 12.

The timing diagram of FIG. 13 shows the phase control signals and the UWB pulse generated, with two different phase values, 0 and 180°, for the two UWB pulses shown; all of these signals are set up by sequencing circuits based on a general clock H that is not shown, allowing the instants corresponding to the starts and ends of the various signals to be very precisely defined.

The following signals are shown:

CLK, representing the periodicity of the UWB pulses; CLK is shown in the form of periodic slots of duration T and of period Tp, corresponding to the desired rate of transmission of the UWB pulses;

a timing signal CLK_PH of the same period Tp and whose duration $T_{INI}$ defines the duration for which the signals ST2 or ST'2 must be applied during the initialization of the oscillation;

a phase selection signal PH, first at the high logic level to define a 0 phase, then at the low level to define a 180° phase;

a signal ST2 that is generated by one of the AND gates for the zero phase;

a signal ST'2 that is generated by the other AND gate for the opposite 180° phase;

a current Ip applied to the differential pair (in the simplest case of a current Ip set up at a single constant level throughout the duration of the oscillation); this current is set up with the transmission period Tp of the UWB pulses, and for a duration $T_{OSC}$ that is shorter than Tp;

an oscillation $V_{OSC}$ generated by the current Ip, with an initiation phase of this oscillation that has two opposite values depending on whether the signal ST2 or the signal ST'2 is issued upon initiation of the oscillation;

a voltage $V_L$ for turning on the radiofrequency switching transistors SW and SW' in the time slot of duration T and with a profile that allows a variable attenuation over the course of this duration;

a UWB pulse in the clock pulse of duration T that reproduces the phase of the oscillation voltage $V_{OSC}$, the first pulse having a 0° phase and the second having a 180° phase.

In FIG. 13, it is assumed that the current Ip is not acted upon for the duration T, but as explained above, it is possible to do it from the moment that the switched oscillator LC comprises multiple current sources and control circuits of these sources synchronized with the clocks that generate the starts and ends of the UWB pulses.

The invention claimed is:

1. A UWB pulse generator comprising:
an oscillator that provides an oscillating signal at a carrier frequency $F_0$ followed by a radiofrequency switching transistor configured for selectively connecting the oscillating signal to an output of the UWB pulse generator and a control circuit that controls a gate of the radiofrequency switching transistor in order to turn the radiofrequency switching transistor it on for a duration of time T that corresponds to a desired duration of a UWB pulse,
wherein the control circuit is arranged so as to successively apply, during one and the same UWB pulse, a first gate voltage that turns the radiofrequency switching transistor on with a first internal resistance value for a first part of the duration T, then at least a second gate voltage that turns the radiofrequency switching transistor on with a second internal resistance value, different from the first value, for a second part of the duration T.

2. The UWB pulse generator of claim 1, wherein the control circuit comprises:

two logic inverters supplied with a supply voltage that have their outputs connected to a gate of the radiofrequency switching transistor via respective resistors; and a sequencing circuit that sets up, at an input of the first logic inverter, a first logic signal for turning the radiofrequency switching transistor on and, at an input of the second logic inverter, a second logic signal for turning the switching transistor on, with a partial overlap between the first and the second logic signal, allowing defining at least one period of time during which only one of the two logic signals is at a level for turning the radiofrequency switching transistor on and one period of time during which both logic signals are at this level, the two periods being adjacent.

3. The UWB pulse generator of claim 2, wherein the oscillating signal generated by the oscillator is a differential signal, and there are two radiofrequency switching transistors that operate symmetrically and are controlled symmetrically by the two logic inverters.

4. The UWB pulse generator of claim 2, wherein the resistors that are connected between an output of an inverter and the gate of a radiofrequency switching transistor are composed of multiple resistors that are switched in order to select a chosen resistance value.

5. The UWB pulse of claim 2, wherein the logic inverters are composed of an array of multiple inverters in parallel with different output impedance characteristics, one logic inverter being selected based on desired resistance characteristics and the logic inverters being able to be selectively placed in a high-impedance state if the logic inverters are not selected.

6. The UWB pulse generator of claim 2, wherein a value of the supply voltage of the logic inverters is modifiable.

7. The UWB pulse generator of claim 1, wherein the oscillator is a LC oscillator with a pair of differential branches whose operation is switched by application or interruption of a supply current to the pair of differential branches, the generator configured to modify the supply current of the pair of branches during the UWB pulse.

8. The UWB pulse generator of claim 7, further comprising a current injection circuit configured to inject a current into one of the outputs of the differential branches so as to unbalance said differential branches during a UWB pulse initiation phase in order to impose an oscillation phase upon initiation.

9. A UWB pulse generator comprising:
an oscillator that provides an oscillating signal at a carrier frequency $F_0$ followed by a radiofrequency switching transistor and a control circuit that controls a gate of the radiofrequency switching transistor in order to turn the radiofrequency switching transistor on for a duration of time T that corresponds to a desired duration of a UWB pulse,
wherein the control circuit is arranged so as to successively apply, during one and the same UWB pulse, a first gate voltage that turns the radiofrequency switching transistor on with a first internal resistance value for a first part of the duration T, then at least a second gate voltage that turns the radiofrequency switching transistor on with a second internal resistance value, different from the first value, for a second part of the duration T, wherein the control circuit comprises:
two logic inverters supplied with a supply voltage that have their outputs connected to a gate of the radiofrequency switching transistor via respective resistors; and
a sequencing circuit that sets up, at an input of the first logic inverter, a first logic signal for turning the radiofrequency switching transistor on and, at an input of the second logic inverter, a second logic signal for turning the switching transistor on, with a partial overlap between the first and the second logic signal, allowing defining at least one period of time during which only one of the two logic signals is at a level for turning the radiofrequency switching transistor on and one period of time during which both logic signals are at this level, the two periods being adjacent.

10. The UWB pulse generator of claim 9, wherein the oscillating signal generated by the oscillator is a differential signal, and there are two radiofrequency switching transistors that operate symmetrically and are controlled symmetrically by the two logic inverters.

11. The UWB pulse generator of claim 9, wherein the resistors that are connected between an output of an inverter and the gate of a radiofrequency switching transistor are composed of multiple resistors that are switched in order to select a chosen resistance value.

12. The UWB pulse of claim 9, wherein the logic inverters are composed of an array of multiple inverters in parallel with different output impedance characteristics, one logic inverter being selected based on desired resistance characteristics and the logic inverters being able to be selectively placed in a high-impedance state if the logic inverters are not selected.

13. The UWB pulse generator of claim 9, wherein a value of the supply voltage of the logic inverters is modifiable.

14. The UWB pulse generator of claim 9, wherein the oscillator is a LC oscillator with a pair of differential branches whose operation is switched by application or interruption of a supply current to the pair of differential branches, the generator configured to modify the supply current of the pair of branches during the UWB pulse.

15. The UWB pulse generator of claim 14, further comprising a current injection circuit configured to inject a current into one of the outputs of the differential branches so as to unbalance said differential branches during a UWB pulse initiation phase in order to impose an oscillation phase upon initiation.

16. A UWB pulse generator comprising:
an oscillator that provides an oscillating signal at a carrier frequency $F_0$ followed by a radiofrequency switching transistor configured for selectively connecting the oscillating signal to an output of the UWB pulse generator and a control circuit that controls a gate of the radiofrequency switching transistor in order to turn the radiofrequency switching transistor on for a duration of time T that corresponds to a desired duration of a UWB pulse,
wherein the control circuit is arranged so as to successively apply, during one and the same UWB pulse, a first gate voltage that turns the radiofrequency switching transistor on with a first internal resistance value for a first part of the duration T, then at least a second gate voltage that turns the radiofrequency switching transistor on with a second internal resistance value, different from the first value, for a second part of the duration T,
wherein the control circuit comprises:
two logic inverters supplied with a supply voltage that have their outputs connected to the gate of the radiofrequency switching transistor via respective resistors; and
a sequencing circuit that sets up, at the input of the first logic inverter, a first logic signal for turning the radiofrequency switching transistor on and, at an input of the second logic inverter, a second logic signal for turning the switching transistor on, with a partial overlap between the first and the second logic signal, allowing defining at least one period of time during which only one of the two logic signals is at a level for turning the radiofrequency switching transistor on and one period of time during which both logic signals are at this level, the two periods being adjacent.

17. The UWB pulse generator of claim 16, wherein the oscillating signal generated by the oscillator is a differential signal, and there are two radiofrequency switching transistors that operate symmetrically and are controlled symmetrically by the two logic inverters.

18. The UWB pulse generator of claim 16, wherein the resistors that are connected between an output of an logic inverter and the gate of a radiofrequency switching transistor are composed of multiple resistors that are switched in order to select a chosen resistance value.

19. The UWB pulse of claim 16, wherein the logic inverters are composed of an array of multiple inverters in parallel with different output impedance characteristics, one logic inverter being selected based on desired resistance characteristics and the logic inverters being able to be selectively placed in a high-impedance state if the logic inverters are not selected.

20. The UWB pulse generator of claim 16, wherein a value of the supply voltage of the logic inverters is modifiable.

* * * * *